(12) United States Patent
Muharemovic et al.

(10) Patent No.: US 10,112,647 B2
(45) Date of Patent: Oct. 30, 2018

(54) GESTURE CONTROL FROM A REMOTE POSITION FOR REVERSING A VEHICLE AND A VEHICLE-TRAILER SYSTEM

(71) Applicant: Continental Automotive Systems, Inc., Auburn Hills, MI (US)

(72) Inventors: Ibro Muharemovic, Shelby Township, MI (US); Brandon Herzog, Waterford, MI (US); Hao Sun, Auburn Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 122 days.

(21) Appl. No.: 15/201,684

(22) Filed: Jul. 5, 2016

(65) Prior Publication Data

US 2017/0043806 A1 Feb. 16, 2017

Related U.S. Application Data

(60) Provisional application No. 62/203,571, filed on Aug. 11, 2015.

(51) Int. Cl.
| | | |
|---|---|---|
| *B62D 13/06* | (2006.01) | |
| *B62D 15/02* | (2006.01) | |
| *G06K 9/00* | (2006.01) | |
| *G06F 3/01* | (2006.01) | |
| *B60D 1/36* | (2006.01) | |
| *B60D 1/24* | (2006.01) | |
| *B60D 1/62* | (2006.01) | |
| *G10L 15/22* | (2006.01) | |

(52) U.S. Cl.
CPC ............. *B62D 13/06* (2013.01); *B60D 1/245* (2013.01); *B60D 1/36* (2013.01); *B60D 1/62* (2013.01); *B62D 15/021* (2013.01); *G06F 3/017* (2013.01); *G06K 9/00355* (2013.01); *G10L 2015/223* (2013.01)

(58) Field of Classification Search
CPC ................................. B60D 1/245; B62D 13/06
See application file for complete search history.

(56) References Cited

U.S. PATENT DOCUMENTS

| | | | | |
|---|---|---|---|---|
| 2015/0251693 A1* | 9/2015 | Lavoie | ................... | B62D 13/06 701/41 |
| 2015/0251697 A1* | 9/2015 | Lavoie | ................... | B62D 13/06 701/523 |
| 2015/0367886 A1* | 12/2015 | Lavoie | ................... | B62D 13/06 701/41 |

\* cited by examiner

*Primary Examiner* — Kimberly S Berona
*Assistant Examiner* — Anshul Sood

(57) ABSTRACT

A backing system for a vehicle comprises a camera for recording a video image of a user performing a gesture and an electronic control unit for the backing system, wherein the electronic control device includes instructions for: determining that the vehicle is backing up; interpreting a gesture with the electronic control unit to determine the meaning of the gesture; calculating a steering angle based upon the meaning of the gesture; and sending a request to a steering system to provide the steering angle.

11 Claims, 3 Drawing Sheets

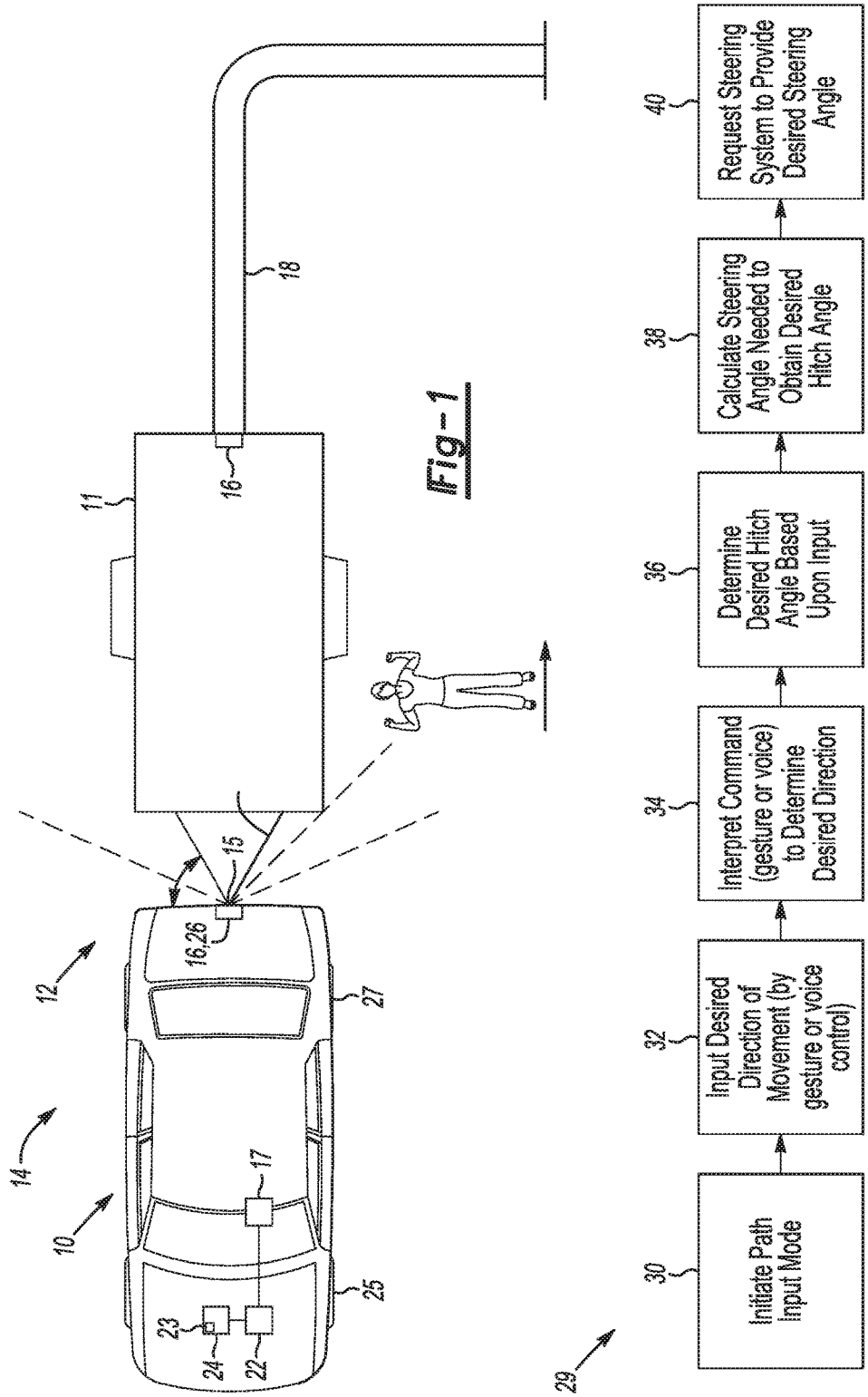

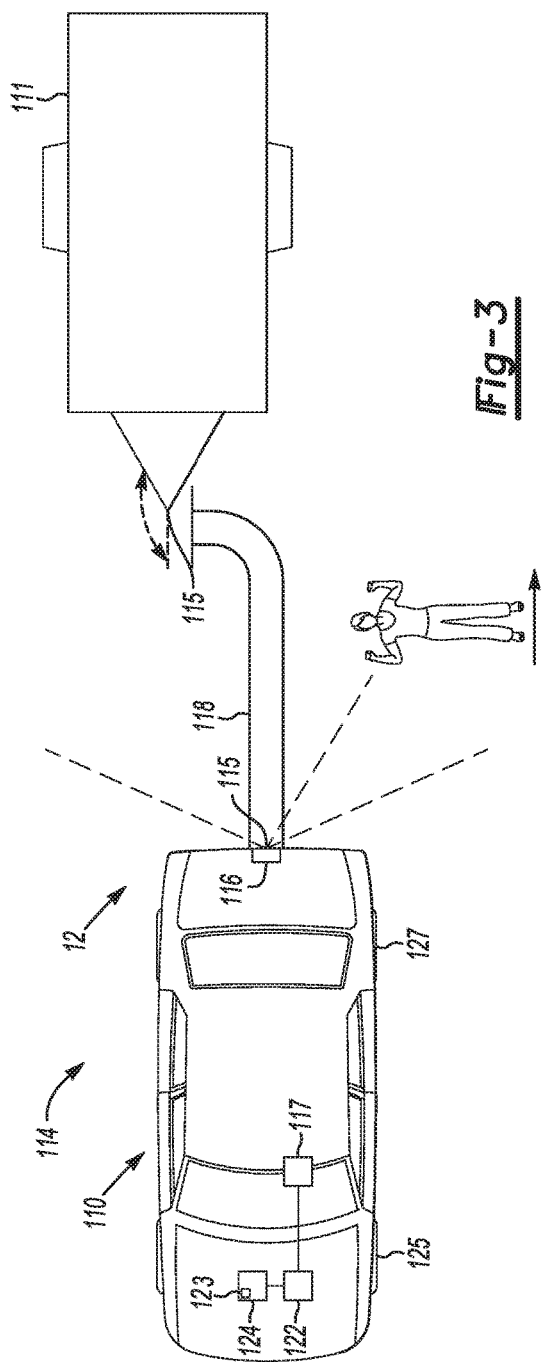
_Fig-3_
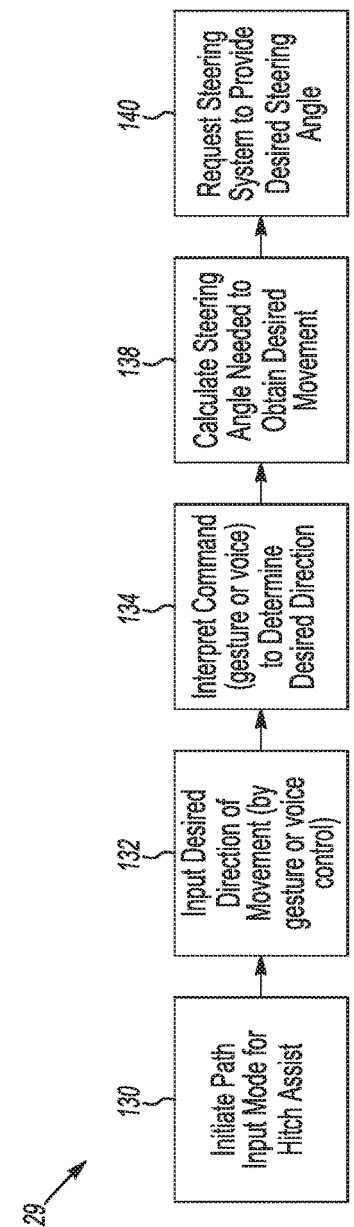
_Fig-4_

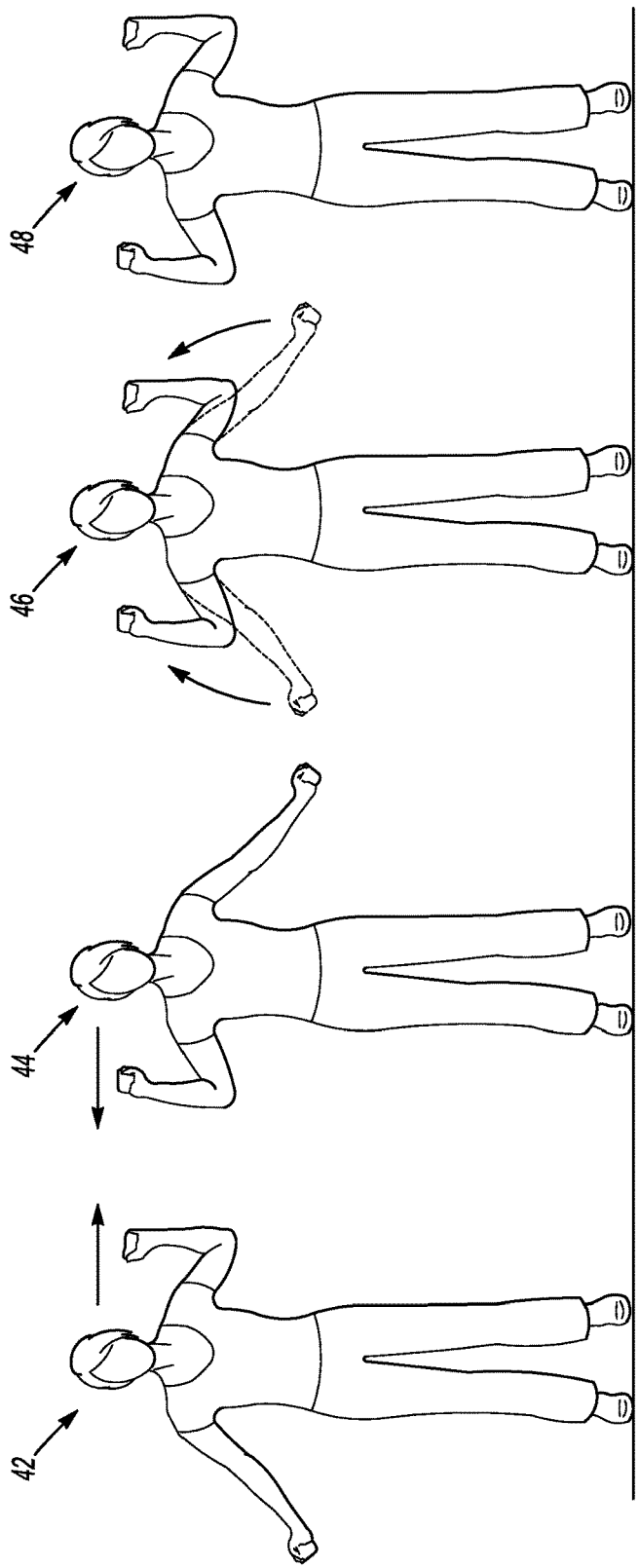

GESTURE CONTROL FROM A REMOTE POSITION FOR REVERSING A VEHICLE AND A VEHICLE-TRAILER SYSTEM

TECHNICAL FIELD

The present invention is related to a method, system and electronic processing device for maneuvering a vehicle to connect to a trailer, and a connected vehicle-trailer system is in the process of backing up.

BACKGROUND

A trailer is typically connected to a towing vehicle through a trailer hitch. Backing a vehicle into the correct position to connect to the trailer hitch typically requires multiple persons, one to view the trailer hitch and direct the movement to the proper vehicle position and one to steer the vehicle.

Additionally, once the vehicle is connected to the trailer the hitch allows the trailer to swivel around the hitch horizontally so that the vehicle-trailer unit is able to move around corners. This, however, can pose difficulties when the vehicle is traveling in the reverse. When the vehicle backs up, it pushes the trailer. In certain situations, it is important that the trailer moves straight ahead or along an intended path, for example when taking a boat to water and the trailer needs to roll down into the water. Drivers are often confused as to which way to turn the vehicle steering wheel to get the desired change of direction of the trailer. Applying an incorrect steering angle in the vehicle may also cause the trailer to jack-knife and lose its course.

Therefore, backing of trailers attached to vehicles often requires multiple persons to effectively control the vehicle and direct the path the vehicle and trailer are required to travel. Additionally, those unaccustomed to operating vehicle and trailer systems may have some difficulty in accurately controlling the path of the trailer while backing the vehicle and trailer.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A backing system for a vehicle comprises a camera for recording a video image of a user performing a gesture and an electronic control unit for the backing system, wherein the electronic control device includes instructions for: determining that the vehicle is backing up; interpreting a gesture with the electronic control unit to determine the meaning of the gesture; calculating a steering angle based upon the meaning of the gesture; and sending a request to a steering system to provide the steering angle.

A method of maneuvering a vehicle-trailer unit in reverse travel with a backing system, wherein the trailer has a front with a trailer tongue and the vehicle has a rear with a trailer hitch, the trailer tongue being connected to the trailer hitch allowing a horizontal swivel movement of the trailer around the hitch the method comprises determining that the vehicle-trailer unit is backing up with an electronic control unit for the backing system. A current hitch angle is determined, which represents the relative angle between the vehicle and the trailer with the electronic control unit. A gesture is recorded with a camera for the vehicle and the gesture is interpreted with the electronic control unit by image analysis of the image recorded by the camera to determine the meaning of the gesture. The gesture is used to determine a requested motion of the trailer. A requested hitch angle is calculated with the electronic control unit, wherein the requested hitch angle is based upon the meaning of the gesture to achieve the desired motion. A steering angle is also calculated with the electronic control unit based upon the requested hitch angle, wherein the steering angle will allow movement of the vehicle-trailer unit in the reverse direction to obtain the requested hitch angle. The electronic control unit sends request to a steering system to provide the steering angle.

A method of maneuvering a vehicle in reverse travel with a backing system, the method comprises determining that the vehicle-trailer unit is backing up with an electronic control unit for the backing system. A gesture is recorded with a camera for the vehicle and the gesture is interpreted with the electronic control unit by image analysis of the image recorded by the camera to determine the meaning of the gesture. A steering angle is also calculated with the electronic control unit based upon the requested hitch angle, wherein the steering angle will allow movement of the vehicle-trailer unit in the reverse direction to obtain the requested hitch angle. The electronic control unit sends request to a steering system to provide the steering angle.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a schematic diagram of a first embodiment of a backing system of the present invention for vehicle-trailer unit backing;

FIG. 2 is a schematic illustration of a method of utilizing the backing system of FIG. 1;

FIG. 3 is a schematic diagram of a second embodiment of the backing system of the present invention to provide vehicle hitch assist;

FIG. 4 is a schematic illustration of a method of utilizing the backing system of FIG. 3;

FIG. 5 is a schematic diagram of a first example gesture for use with the backing system of FIGS. 1-4;

FIG. 6 is a schematic diagram of a second example gesture for use with the backing system of FIGS. 1-4;

FIG. 7 is a schematic diagram of a third example gesture for use with the backing system of FIGS. 1-4; and FIG. 8 is a schematic diagram of a fourth example gesture for use with the backing system of FIGS. 1-4.

DETAILED DESCRIPTION

The following description is merely exemplary in nature and is in no way intended to limit the disclosure, its application, or uses. For purposes of clarity, the same reference numbers will be used in the drawings to identify similar elements.

FIG. 1 illustrates a vehicle 10 and a trailer 11. The trailer 11 is controllably secured to the vehicle 10 to form a vehicle-trailer unit 12. The vehicle-trailer unit 12 utilizes a backing system 14 of the present invention. Throughout the application the relative directions of forward and rear are in reference to the direction which an operator for the vehicle 10 would typically be facing when operating the vehicle 10 in a drive gear on a public road. Therefore, in operation of the backing system 14 the vehicle 10 would be in a reverse gear and the operator may be facing backward. The backing system 14 provides the vehicle operator with a method of electronically defining an intended backing direction 18 of the vehicle-trailer unit 12. The backing system 14 utilizes the intended backing path 18 to control movement of vehicle-trailer unit 12.

The vehicle-trailer unit 12 uses gesture controls to determine the intended backing path 18 a secondary control input may also include voice recognition to determine the intended backing path 18, as described in further detail below. Using the gesture control input and the voice recognition input the driver may be located outside of the vehicle 10 to direct the vehicle-trailer unit 12 along the intended path 18. The backing system 14 uses an input device for the backing system 14 would include at least a camera 16 to record video image of the user gestures, example gestures shown in FIGS. 5-8, and to interpret the gestures with an electronic control unit (ECU) 22. Although a camera 16 is used and described herein other sensors capable of detecting movement and gestures by humans could also be used, e.g. a LIDAR sensor or a radar sensor. When voice control is also used the input device for the backing system 14 would include at least a microphone 17 to record sound from the user and to interpret the sounds to specific directions with an electronic control unit (ECU) 22. When control is intended to occur from outside the vehicle 10 the camera 16 and microphone 17 may be positioned to capture input from outside the vehicle 10 in an area proximate to the vehicle-trailer unit 12.

Referring to FIGS. 1-2, a first embodiment for utilizing the backing system 14 is described. The trailer 11 is connected to the vehicle 10 through trailer hitch 15, which allows the trailer to swivel horizontally around the vertical axis of the trailer hitch 15, which is the axis vertical to the drawing plane. The backing system 14 includes the ECU 22. The ECU 22 may be connected to at least one vehicle system 24 such as a steering system. Other vehicle 10 systems, such as powertrain and/or brake systems to control and direct movement of the vehicle-trailer unit 12 may also be connected to the control unit 22.

The ECU 22 communicates with a control module 23 for the steering system 24. The control module 23 is an electronic processing unit controlling an active power steering system 24 that is capable of actively changing a steering angle of front axle wheels 25 without the vehicle driver giving a respective input through the vehicle steering wheel. The active power steering system 24 may also include the capability of additionally steering the rear axle wheels 27. The control module 23 computes corrective actions to be taken in order to maneuver the vehicle and initiates the power steering system 24 accordingly. Thus, the control unit 22 sends instructions to the steering system 24 to move the vehicle-trailer unit 12 based upon the input from the control unit 22.

The backing system 14 includes a sensor 26 to help determine hitch angle of the vehicle-trailer unit 12. The backing system 14 may utilize sensors which are already incorporated into the vehicle 10, such as proximity sensors or back-up camera or may be separate sensors for the backing system 14. The sensor 26 may be used to measure hitch angle of the vehicle-trailer unit 12. The sensor 26 may be one or multiple sensors measuring relative distance between the vehicle 10 and the trailer 11 and using the varied distance to calculate hitch angle. The sensors 26 may use horizontal or vertical features on the trailer 11 in the distance measurement.

In one embodiment the sensor 26 is a camera, either the same camera or an additional second camera to be used as the input device for gesture control. The second camera 26 may capture an image and image analysis may be used to calculate the hitch angle, as explained herein. A distinct marking can be established on the trailer 11 and captured by the second camera 26 for analysis. For example, the marking may be three or more dots spaced apart from one another and positioned on the front of the trailer 11 proximate to the hitch 15. The second camera 26 may capture an image of the marking and the ECU 22 may analyze the image to determine the relative position of the dots to one another. The ECU 22 compares the relative distances of the dots and to stored data of the relative distances. The stored data would include at what hitch angle those relative distances would occur. Thus, the hitch angle can be calculated using a camera for the sensor 26 and a predetermined distinct marking. The marking may be specific to the trailer backing system 14, e.g. a known decal to be applied to the trailer, since the relative distances of the markings may be prerecorded by the ECU 22. The distance to the marking from the camera 16 may also need to be input into the system 14. Alternately, the ECU 22 may employ a learning mode to learn the relative distances at know hitch angles the first time the system 14 is used.

FIG. 2 illustrates an embodiment of a method, shown at 29, of using gesture control for the trailer backing system 14. The path input mode for the trailer backing system 14 is initiated, step 30. Initiating path input mode, step 30 may include selecting what type of input would be preferred, gesture control or voice control. The user may also be able to select an input location, inside or outside. Selecting input location may be used to initiate the input device 16, 116 that corresponds to the desired location. For example, if user selects exterior gesture control input a camera 16 positioned to capture the area proximate the vehicle-trailer unit 12 may be started. The camera 16 could be located on the vehicle 10 or the trailer 11 in a position to capture a rear, or side rear position of a user, as shown in FIG. 1.

A user would employ the camera 16 to input an intended direction of moving the trailer 11, step 32. That is, the user moves to a location within the camera view. The user performs a gesture to indicate a desired movement. FIGS. 5-8 illustrate example gestures that the user may employ. Gestures may be selected to be "intuitive" of those typically used in providing direction to drivers of backing trailers. Arm gestures, as illustrated in FIGS. 5-8, or similar hand gestures may be used. To stay within view of the camera 16 the user may need to move as the vehicle-trailer unit 12 moves, indicated by arrow.

The ECU 22 interprets gestures from a user to detect the desired movement, step 34. The trailer backing system 14 is designed to work real-time in which the vehicle-trailer unit 12 moves as the user inputs the directions. Based upon the gestures the ECU 22 interprets the gesture to a specific request for trailer movement, and determine the desired hitch angle, i.e. increase, decrease, remain the same, step 36. The ECU 22 may continue to incrementally change the hitch angle as long as the user continues with the current motion (left or right) and then stop changing the hitch angle once the gesture indicates to do so.

Once the desired hitch angle, or change in hitch angle is determined the ECU 22 calculates the steering angle that would be needed to obtain the desired hitch angle, step 38 The ECU 22 then requests the steering system 26 to provide the desired steering action, step 40.

Additionally, if the actual angle between the vehicle and the trailer differs from an intended angle by an amount greater than a stored threshold value, the power steering system 24 applies a corrective steering angle. The threshold value corresponds to a difference caused by a relatively small angle of at most 10°. The smaller the stored threshold value is, the more sensitive the control will be. The exact threshold value may be empirically determined to best satisfy a driver's need. It could also be set by the driver of the respective vehicle 10. As mentioned above, anti-jack knife measures may limit the maximum and/or minimum trailer angle request.

As mentioned above, a secondary input device 17 may also be used along with the gesture control input 16. The secondary input device 17 may be a voice control system. The voice control system 17 may be connected to or partially incorporated with other vehicle 10 devices for performing various vehicle 10 functions. The other devices that may be electronically connected include, for example, a telephone, a navigation system, an audio system, a CD changer, or an HVAC system. The voice control includes an audio input 17 and possibly an audio output for the vehicle 10.

The microphone 17 could be located on the vehicle 10 or the trailer 11 in a position to capture a rear, or side rear position of a user, as shown in FIG. 1. In this manner voice commands, i.e. "stop", could provide direction to the backing system 14 making the design more robust. A user would employ the microphone 16 to input an intended direction of moving the trailer 11. That is, the given directions indicating the desired movement of the vehicle-trailer unit 12. Simple directions and distances may be used for voice input of the intended path 18, e.g. "back 10 feet", "stop", "turn right 90 degrees", "final position". The ECU 22 converts the audio input 17 from the vehicle operator into an electrical signal that can be used by the backing system 14.

An optional additional camera can be mounted at the rear of the trailer and facing backward. Such a camera could further aid the driver of the vehicle if the direct view in the driving direction is obstructed while traveling in the reverse.

FIG. 3 illustrates a vehicle 110 and a trailer 111. The vehicle 110 utilizes a backing system 114 of the present invention. The backing system 114 provides the vehicle operator with a method of electronically defining an intended backing direction 118 of the vehicle 110. The backing system 114 utilizes the intended backing path 118 to control movement of vehicle 110.

The vehicle 110 uses gesture controls to determine the intended backing path 118 a secondary control input may also include voice recognition to determine the intended backing path 118, as described in further detail below. Using the gesture control input and the voice recognition input the driver may be located outside of the vehicle 110 to direct the vehicle 110 along the intended path 118. The backing system 114 uses an input device for the backing system 114 would include at least a camera 116 to record video image of the user gestures, example gestures shown in FIGS. 5-8, and to interpret the gestures with an electronic control unit (ECU) 122. When voice control is also used the input device for the backing system 114 would include at least a microphone 117 to record sound from the user and to interpret the sounds to specific directions with an electronic control unit (ECU) 122. When control is intended to occur from outside the vehicle 110 the camera 116 and microphone 117 may be positioned to capture input from outside the vehicle 110 in an area proximate to the vehicle 110. The microphone 117 may be mounted to the vehicle 110, part of a vehicle system or from a separate device that is linked to the backing system 114, such as a phone microphone that is linked through Bluetooth or another type of connection.

Referring to FIGS. 3-4, a second embodiment for utilizing the backing system 114 is described. The trailer 111 is desired to be connected to the vehicle 110 through trailer hitch 115, which allows the trailer to swivel horizontally around the vertical axis of the trailer hitch 115, which is the axis vertical to the drawing plane. The backing system 114 includes the ECU 122. The ECU 122 may be connected to at least one vehicle system 124 such as a steering system. Other vehicle 110 systems, such as powertrain and/or brake systems to control and direct movement of the vehicle 110 may also be connected to the control unit 122.

The ECU 122 communicates with a control module 125 for the steering system 124. The control module 125 is an electronic processing unit controlling an active power steering system 124 that is capable of actively changing a steering angle of front axle wheels 125 without the vehicle driver giving a respective input through the vehicle steering wheel. The active power steering system 124 may also include the capability of additionally steering the rear axle wheels 127. The control module 125 computes corrective actions to be taken in order to maneuver the vehicle and initiates the power steering system 124 accordingly. Thus, the control unit 122 sends instructions to the steering system 124 to move the vehicle 110 based upon the input from the control unit 122 toward the trailer hitch 115.

The backing system 114 may utilize sensors 126 which are already incorporated into the vehicle 110, such as proximity sensors or back-up camera. The sensor 126 may be used to measure proximity to the trailer hitch 115. The sensor 126 may be one or multiple sensors measuring relative distance between the vehicle 110 and the trailer 111 and using the varied distance to calculate the distance to the hitch 115 on a two-dimensional plane. The sensors 126 may use both horizontal and vertical features on the trailer 111 in the distance measurement. In one embodiment the sensor 126 is a camera, either the same camera or an additional second camera to the camera 116 used as the input device for gesture control.

FIG. 4 illustrates a second embodiment of a method, shown at 129, of using gesture control for the backing system 114. The path input mode for the backing system 114 is initiated, step 130. Initiating path input mode, step 130 may include selecting what type of input would be preferred, gesture control or voice control. The user may also be able to select an input location, inside or outside. Selecting input location may be used to initiate the input device 116 that corresponds to the desired location. For example, if user selects exterior gesture control input a camera 116 positioned to capture the area proximate the vehicle 110 may be started. The camera 116 could be located on the vehicle in a position to capture a rear, or side rear position of a user, as shown in FIG. 3.

A user would employ the camera 116 to input an intended direction of moving the vehicle 110, step 132. That is, the user moves to a location within the camera view. The user performs a gesture to indicate a desired movement. FIGS. 5-8 illustrate example gestures that the user may employ.

Gestures may be selected to be "intuitive" of those typically used in providing direction to drivers of backing trailers. Arm gestures, as illustrated in FIGS. 5-8, or similar hand gestures may be used. To stay within view of the camera 116 the user may need to move as the vehicle 110 moves, indicated by arrow.

The ECU 122 interprets gestures from the user to detect the desired movement, step 134. The backing system 114 is designed to work real-time in which the vehicle 110 moves as the user inputs the directions. Based upon the gestures the ECU 122 interprets the gesture to a specific request for vehicle 110 movement, and calculates the steering angle that would be needed to obtain the desired movement, step 138 The ECU 122 then requests the steering system 126 to provide the desired steering action, step 140.

As mentioned above, a secondary input device 117 may also be used along with the gesture control input 116. The secondary input device 117 may be a voice control system. The voice control system 117 may be connected to or partially incorporated with other vehicle 110 devices for performing various vehicle 110 functions. The other devices that may be electronically connected include, for example, a telephone, a navigation system, an audio system, a CD changer, or an HVAC system. The voice control includes an audio input 117 and possibly an audio output for the vehicle 10.

The microphone 117 could be located on the vehicle 110 in a position to capture a rear, or side rear position of a user, as shown in FIG. 3. In this manner voice commands, i.e. "stop", could provide direction to the backing system 14 making the design more robust. A user would employ the microphone 116 to input an intended direction of moving the vehicle 110. Simple directions and distances may be used for voice input of the intended path 18, e.g. "back 10 feet", "stop", "turn right 90 degrees", "final position". The ECU 122 converts the audio input 117 from the vehicle operator into an electrical signal that can be used by the backing system 114.

Referring to FIGS. 5-8, the user moving their left hand toward the left, shown at 42, may indicated a desire to change the movement in that direction, such that the trailer 11 or vehicle 110 moves more in that direction, FIG. 5. The user moving their right hand toward the right shown at 44, may indicated a desire to change the movement in that direction, such that the trailer 11 or vehicle 110 moves more in that direction, FIG. 6. The user moving one or both hands toward their body, shown at 46, may indicate a desire to continue in the current direction of movement, FIG. 7. The user moving or holding one or both hands away from their body, shown at 48, may indicate a desire to stop, FIG. 8. Other arm and hand gestures may also or alternatively be employed.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A backing system for a vehicle, the backing system comprising:
a camera for recording a video image of a user performing a gesture, the camera mounted to the vehicle or to a trailer in communication with the vehicle;
a microphone mounted to the vehicle or to the trailer in a position to capture a rear, or side rear position of the user, the microphone for capturing a voice command; and
an electronic control unit for the backing system, the electronic control unit in communication with the camera and the microphone, the electronic control unit includes instructions for:
determining that the vehicle is backing up;
interpreting the gesture with the electronic control unit to determine a meaning of the gesture;
calculating a first steering angle based upon the meaning of the gesture;
sending a first request to a steering system to provide the first steering angle;
calculating a second steering angle directly based upon the voice command; and
sending a second request to the steering system to provide the second steering angle.

2. The backing system of claim 1, wherein the trailer has a front with a trailer tongue and the vehicle has a rear with a trailer hitch, the trailer tongue being connected to the trailer hitch allowing a horizontal swivel movement of the trailer around the hitch, the system further comprising a sensor for sensing a current hitch angle, which represents a relative angle between the vehicle and the trailer.

3. The backing system of claim 2, wherein the electronic control unit further includes instructions for:
determining the current hitch angle, based upon information from the sensor;
calculating a requested hitch angle with the electronic control unit, wherein the requested hitch angle is based upon the meaning of the gesture; and
calculating the first and second steering angles based upon the requested hitch angle, wherein the first and second steerings angle allows movement of the vehicle or a vehicle-trailer unit including the vehicle and a trailer in a reverse direction to obtain the requested hitch angle.

4. The backing system of claim 1, wherein the vehicle has a driver-operable back-up assistance switch activating an automatic back-up, and wherein the electronic control unit has instructions for detecting that the switch has been set to activate the backing system.

5. A method of maneuvering a vehicle-trailer unit in reverse travel with a backing system, a trailer of the vehicle-trailer unit has a front with a trailer tongue and the vehicle has a rear with a trailer hitch, the trailer tongue being connected to the trailer hitch allowing a horizontal swivel movement of the trailer around the hitch, the method comprising:
determining that the vehicle-trailer unit is backing up with an electronic control unit for the backing system;
determining a current hitch angle with the electronic control unit, the current hitch angle representing a relative angle between the vehicle and the trailer;
recording a gesture with a camera for the vehicle;
capturing voice command with a microphone mounted to the vehicle or to the trailer, the microphone positioned to capture a rear, or side rear position of a user;
interpreting the gesture with the electronic control unit to determine a meaning of the gesture;
calculating a first requested hitch angle with the electronic control unit, the first requested hitch angle is based upon the meaning of the gesture;
calculating a second requested hitch angle with the electronic control unit, the second requested hitch angle is directly based upon the voice command;

calculating, at the electronic control unit, a first steering angle based upon the first requested hitch angle and a second steering angle based upon the second requested hitch angle, wherein the first and second steering angles allow movement of the vehicle-trailer unit in a reverse direction to obtain the first and second requested hitch angles;

sending a first request to a steering system to provide the first steering angle; and sending a second request to the steering system to provide the second steering angle.

6. The method of claim 5, further comprising calculating additional steering angles to provide additional requested hitch angles while the vehicle-trailer unit is moving in the reverse direction, and sending the additional requests to the steering system.

7. The method of claim 6, wherein when the requested hitch angle is obtained the backing system continues to request the steering angle required to move the vehicle-trailer unit at the requested hitch angle.

8. The method of claim 5, wherein the backing system incrementally changes the current hitch angle when the request is to move in one of a left and right direction.

9. The method of claim 5, wherein the vehicle has a driver-operable back-up assistance switch activating an automatic back-up, the method including the step of detecting that the switch has been set to activate the method.

10. A method of maneuvering a vehicle in a reverse travel direction with a backing system, the method comprising:

determining that the vehicle is backing up with an electronic control unit for the backing system;

recording a gesture with a camera for the vehicle, the camera mounted to the vehicle or to a trailer in communication with the vehicle;

capturing voice command with a microphone mounted to the vehicle or to a trailer in communication with the vehicle, the microphone positioned to capture a rear, or side rear position of a user;

interpreting the gesture with the electronic control unit to determine a meaning of the gesture;

calculating, at the electronic control unit, a first steering angle based upon the meaning of the gesture and a second steering angle directly based on the voice command, wherein the first and second steering angles allow movement of the vehicle in the reverse travel direction;

sending a first request to a steering system to provide the first steering angle; and sending a second request to the steering system to provide the second steering angle.

11. The method of claim 10, wherein the vehicle has a driver-operable back-up assistance switch activating an automatic back-up, the method including the step of detecting that the switch has been set to activate the method.

* * * * *